(12) United States Patent
Lee et al.

(10) Patent No.: US 9,190,638 B2
(45) Date of Patent: Nov. 17, 2015

(54) SEALING CASE

(71) Applicant: SAMSUNG SDI CO., LTD, Yongin-si, Gyeonggi-do (KR)

(72) Inventors: Jun-Ho Lee, Yongin-si (KR); Sang-Kyu Ahn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 121 days.

(21) Appl. No.: 13/803,239

(22) Filed: Mar. 14, 2013

(65) Prior Publication Data

US 2014/0106211 A1 Apr. 17, 2014

(30) Foreign Application Priority Data

Oct. 15, 2012 (KR) .................. 10-2012-0114219

(51) Int. Cl.
*H01M 2/08* (2006.01)
*H01M 2/02* (2006.01)
*H01M 2/10* (2006.01)
*H01M 2/04* (2006.01)

(52) U.S. Cl.
CPC .............. *H01M 2/08* (2013.01); *H01M 2/024* (2013.01); *H01M 2/1077* (2013.01); *H01M 2/0413* (2013.01); *H01M 2/0473* (2013.01); *H01M 2220/10* (2013.01)

(58) Field of Classification Search
CPC ......... H01M 2/00; H01M 6/00; H01M 10/00; H01M 2002/00; H01M 2220/10; H01M 2/024; H01M 2/08; H01M 2/1077; H01M 2/0413; H01M 2/073

USPC ......... 429/139, 151, 163, 171, 172, 173, 174, 429/180, 184, 185, 78
See application file for complete search history.

(56) References Cited

U.S. PATENT DOCUMENTS

| 1,703,735 A * | 2/1929 | Holland ................ 429/185 |
| 3,798,073 A * | 3/1974 | Karpal ................ 429/54 |
| 5,946,501 A * | 8/1999 | Hayakawa ................ 396/25 |
| 2012/0164500 A1* | 6/2012 | Loo et al. ................ 429/82 |

FOREIGN PATENT DOCUMENTS

| JP | 2012-049077 A | 3/2012 |
| KR | 10 2008-0060659 A | 7/2008 |
| KR | 10 2011-0019924 A | 3/2011 |

\* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A sealing case includes a main body with an opening, the main body including a housing space therein, a cover configured to cover the opening of the main body, a first fastening portion along an outer circumferential portion of the opening of the main body, a second fastening portion on the cover and corresponding to the first fastening portion, and a sealing member interposed between the main body and the cover, the sealing member having a 'U' shape and being fitted between the first fastening portion on the main body and a second fastening portion on the cover.

17 Claims, 6 Drawing Sheets

SEALING CASE

CROSS-REFERENCE TO RELATED APPLICATION

The present application claims priority under 35 U.S.C. §119 to Korean Patent Application No. 10-2012-0114219, filed on Oct. 15, 2012, in the Korean Intellectual Property Office, and entitled: "Sealing Case," which is incorporated by reference herein in its entirety.

BACKGROUND

1. Field

Example embodiments relate to a sealing case, and more particularly, to a sealing case having a new coupling structure.

2. Description of the Related Art

Battery packs have recently been used as various types of power sources, and are configured as large-capacity ones to output high power. Some of the battery packs are used by being buried in the ground for the purpose of safety. In this case, the battery packs should be stably maintained for a long period of time even in an environment having high humidity. Therefore, the battery packs are housed using a sealing case, etc.

SUMMARY

Embodiments provide a sealing case having a new coupling structure for a sealing case.

Embodiments also provide a sealing case having improved water-tightness.

Embodiments further provide a sealing case capable of stably keeping battery packs for a long period of time even in a high moisture environment.

According to an aspect of example embodiments, a sealing case includes a main body with an opening, the main body including a housing space therein, a cover configured to cover the opening of the main body, a first fastening portion along an outer circumferential portion of the opening of the main body, a second fastening portion on the cover and corresponding to the first fastening portion, and a sealing member interposed between the main body and the cover, the sealing member having a 'U' shape and being fitted between the first fastening portion on the main body and a second fastening portion on the cover.

The first fastening portion may extend from the main body toward the cover, and the second fastening portion houses the first fastening portion.

The cover may include a base portion facing the opening of the main body, and the second fastening portion along a perimeter of the base portion, the second fastening portion including a first side portion and a second side portion parallel to each other and extending from the base portion, the first fastening portion being inserted between the first and second side portions.

A fastening space may be defined between the first and second side portions, the first fastening portion and the sealing member being inserted into the fastening space.

The sealing member may contact a terminal edge of the first fastening portion, the first fastening portion being tightly inserted into the sealing member.

The sealing member may include a support portion and a pair of extending portions extended from opposite ends of the support portion to define the 'U' shape, the first fastening portion being inserted between the pair of extending portion, and the support portion contacting the terminal edge of the first fastening portion.

An edge of the extending portion may be rounded.

A thickness of the extending portion may increase as the extending portion approaches the edge thereof.

At least one of an inner surface and an outer surface of the support portion may include an embossing protruding therefrom.

The inner surface of the support portion may include at least one first embossing protruding toward the first fastening portion to contact the first fastening portion, and the outer surface of the support portion opposite the inner surface includes at least one second embossing protruding toward the second fastening portion to contact the second fastening portion.

The main body may include a first coupling portion protruding from an outer surface of the first fastening portion, and the cover includes a second coupling portion protruding from the second fastening portion to face the first coupling portion.

The first coupling portion may be perpendicular to the first fastening portion, the second coupling portion being bent from an end of the second fastening portion to be perpendicular to the second fastening portion, and the first and second coupling portions overlapping each other.

At least one first through-hole may be provided in the first coupling portion and at least one second through-hole corresponding to the first through-hole is provided in the second coupling portion, the first and second through-holes being fastened by a fastening member.

The main body may further include a flange portion perpendicular to the first coupling portion at one end of the first coupling portion, the flange portion overlapping the outer surface of the first fastening portion.

The sealing case may further include at least one first rib on outer surfaces of the first coupling portion and the first fastening portion, the first rib being spaced apart from the first through-hole.

The sealing case may further include a second rib on the second coupling portion at a position corresponding to the first rib.

The first rib may be connected to the first coupling portion and the first fastening portion, the first rib having a triangular cross-section and being perpendicular to the first coupling portion and the first fastening portion.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
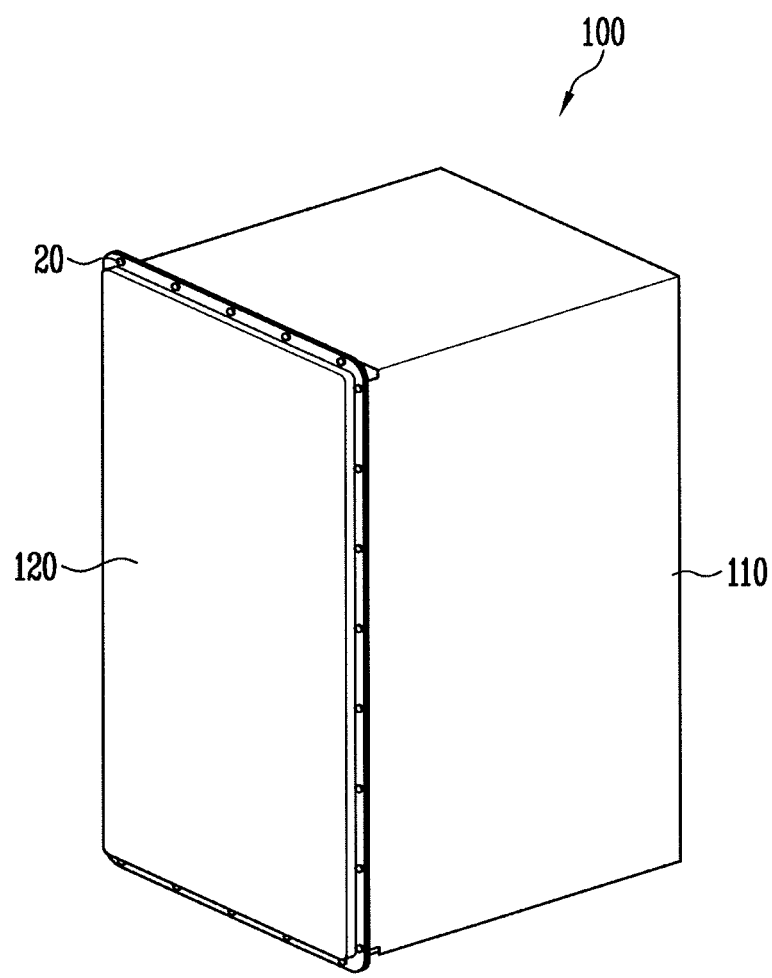
FIG. 1 illustrates a perspective view of a sealing case according to an embodiment.

Korean Patent Application No. 10-2012-0114219, filed on Oct. 15, 2012, in the Korean Intellectual Property Office, and entitled: "SEALING CASE" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer, e.g., an element, is referred to as being "on" another layer or substrate, it can be directly on the other layer or substrate, or intervening layers may also be present. Further, it will be understood that when a layer is referred to as being "connected to" another layer, they layers can be directly connected to each other, or one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, an exemplary embodiment will be described in detail with reference to FIGS. 1-2. FIG. 1 illustrates a perspective view of a sealing case according to an embodiment, and FIG. 2 illustrates an exploded perspective view of the sealing case of FIG. 1.

Figure 2:
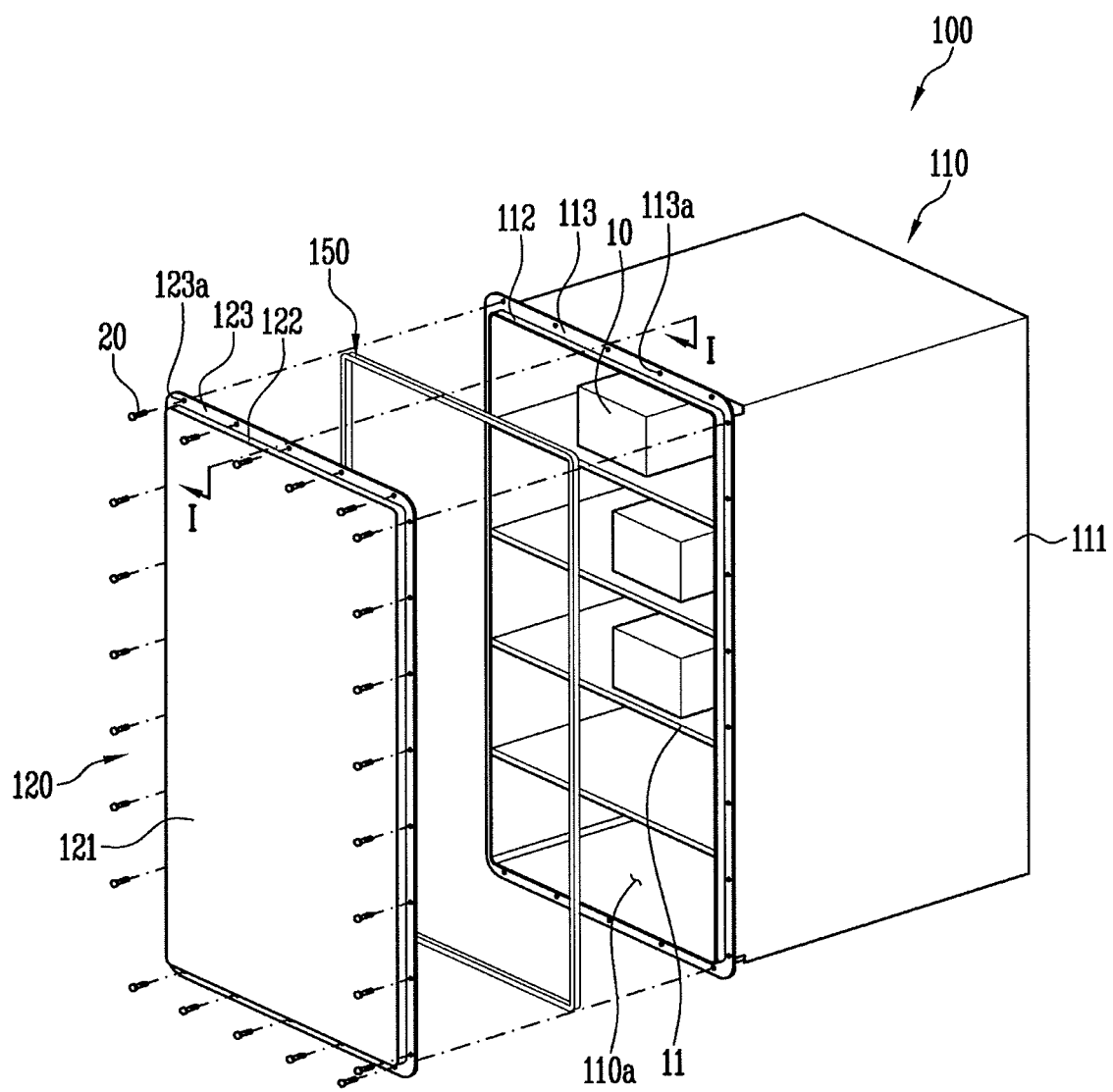
FIG. 2 illustrates an exploded perspective view of the sealing case in FIG. 1.

Referring to FIGS. 1 and 2, a sealing case 100 according to this embodiment may include a main body 110 with an opening 110a to define a housing space therein, a cover 120 that covers the opening 110a of the main body 110, and a sealing member 150 interposed between the main body 110 and the cover 120. A first fastening portion 112 is provided along an outer perimeter portion of the first surface 111 of the main body 110, i.e., to surround the opening 110a, and second fastening portions 122 and 124 (See FIG. 3A) corresponding to the first fastening portion 112 are provided along a perimeter of the cover 120. The sealing member 150 is provided between the first fastening portion 112 and each of the second fastening portions 122 and 124, and the cross-section of the sealing member 150 may have a rotated "Π" shape, e.g., a 'U' or 'n' shape. In this case, the main body 110 and the cover 120 may be coupled to be water-tight by the first and second fastening portions 112, 122 and 124, and the sealing member 150.

In detail, the sealing case 100 according to this embodiment may include the main body 110 with a housing space therein. For example, the main body 110 may include a first surface 111 shaped in any suitable polyhedron with the opening 110a through one face, e.g., the main body 110 may be a prism with the opening 110a replacing one face thereof. At least one rib 11 may be provided in the housing space, i.e., inside the main body 110, so that the housing space may be partitioned into a plurality of spaces. At least one battery pack 10 may be mounted on the rib 11. The battery pack 10 may be configured to include at least one battery cell that generates electrical energy through reversible charging/discharging, a protective circuit module that protects the battery cell, etc. A connector connected to the outside of the battery pack 10 is provided to the battery pack 10, so the electrical energy can be transmitted from the battery pack 10 to an external device through the connector.

The main body 110 and the cover 120 may be fastened by the first and second fastening portions 112, 122 and 124. In this case, the first fastening portion 112 may be provided to extend toward the cover 120 from the main body 110, and the second fastening portions 122 and 124 may be provided to house the first fastening portion 112, as will be discussed in more detail below with reference to FIGS. 3A-3B.

Figure 3A:
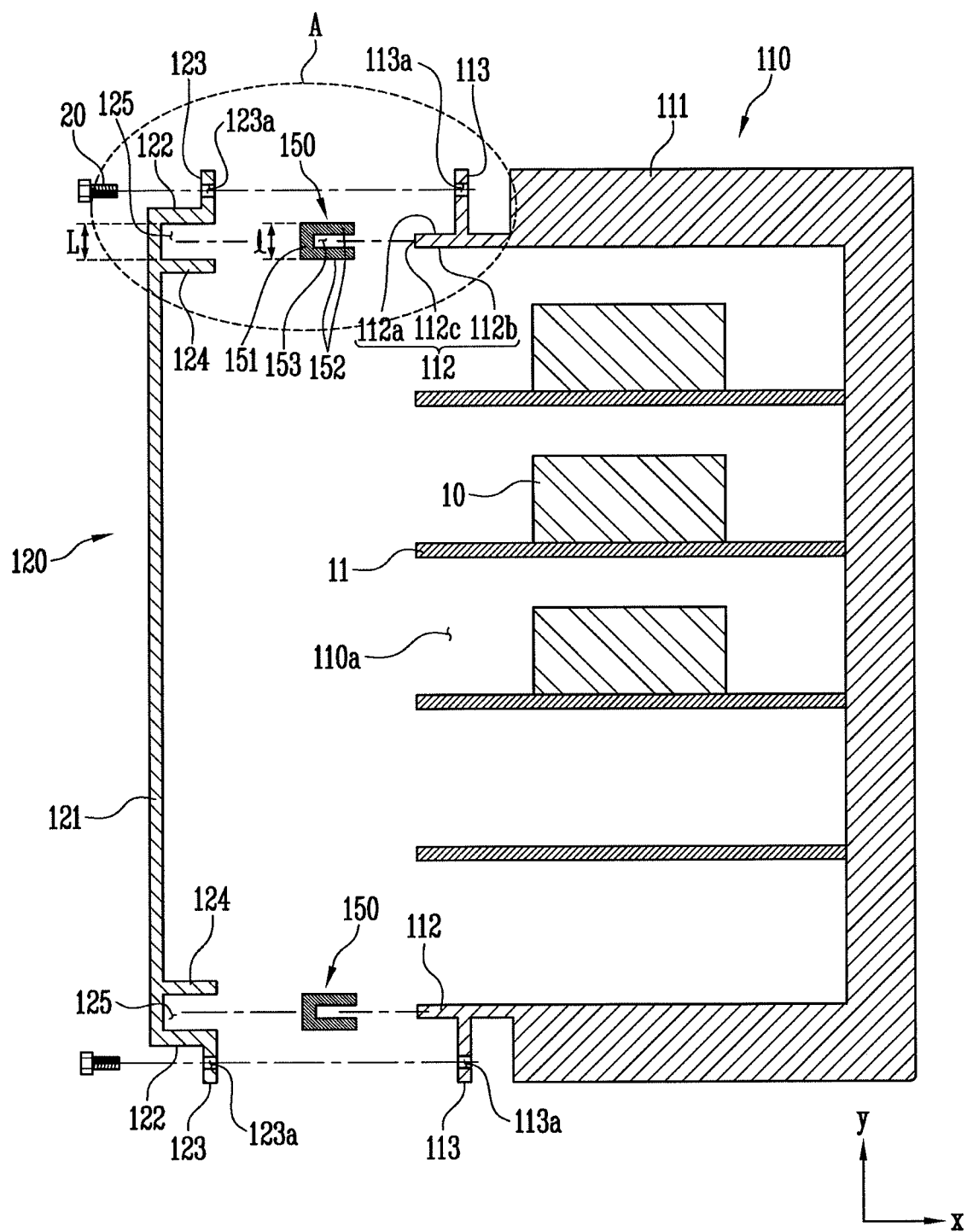
FIG. 3A illustrates an exploded cross-sectional view along line I-I of FIG. 2.
Figure 3B:
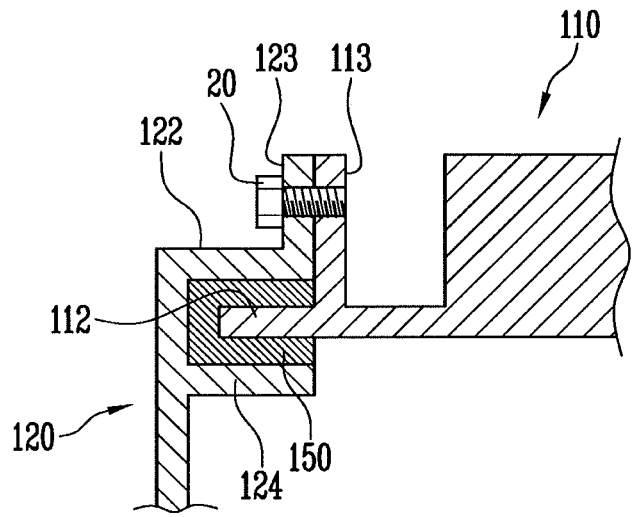
FIG. 3B illustrates an assembled view of portion A of FIG. 3A.

FIG. 3A illustrates a sectional view taken along line I-I of FIG. 2. FIG. 3B illustrates an assembled view of portion A of FIG. 3A.

Referring to FIGS. 3A and 3B, the main body 110 may be configured to include a first surface 111 defining the housing space and the opening 110a, and the first fastening portion 112 around the opening 110a and extending from the first surface 111. For example, first fastening portion 112 may surround the entire opening of the main body 110 to define a frame of the opening. The thickness of the first fastening portion 112, e.g., along the y-axis, may be thinner than that of the main body 110, e.g., along the z-axis, so that the first fastening portion 112 can be extended in parallel, e.g., along the x-axis, from the main body 110. The main body 110 is provided to have the housing space therein, and may be variously modified according to the shape and number of objects therein, e.g., battery packs 10, which are provided in the housing space.

In the portion A of FIG. 3A, the cover 120 may be configured to include a base portion 121 that faces the opening 110a of the main body 110, and the second fastening portions 122 and 124 provided along an outer circumferential portion of the base portion 121. The second fastening portions 122 and 124 may be configured to include a first side portion 122 adjacent to an outer surface 112a of the first fastening portion 112, and a second side portion 124 adjacent to an inner surface 112b of the first fastening portion 112 and inwardly spaced apart from the first side portion 122 so as to be provided in parallel with the first side portion 122. For example, the first and second side portions 122 and 124 may extend along the x-axis and may be spaced apart from each other along the y-axis, so the first fastening portion 112 may fit in a space therebetween.

In detail, the first side portion 122 may extend from an edge, e.g., a terminal end, of the base portion 121 toward the main body 110, so the first side portion 122 and the base portion 121 may define an inverted "L" shape. The second side portion 124 may be spaced apart from the first side portion 122 to protrude from an inner surface of the base portion 121 toward the main body 110. For example, the second side portion 124 may be substantially perpendicular to the base portion 121. A fastening space 125 is provided between the first and second side portions 122 and 124, and the first fastening portion 112 and the sealing member 150 may be inserted into the fastening space 125. The first and second side portions 122 and 124 may continuously extend to surround the entire perimeter of the cover 120 (illustrated as top and bottom portions in the cross-sectional view of FIG. 3A), so the first fastening portion 112 and the sealing member 150 may continuously fill the entire fastening space 125 along the entire perimeter of the cover 120.

The sealing portion 150 may be interposed between the first fastening portion 112 and each of the second fastening portions 122 and 124. In other words, as the sealing portion 150 may have a 'U' shape, the open portion of the sealing portion 150 may be wrapped around the first fastening portion 112, so the combined sealing portion 150 and first fastening portion 112 may fit in the fastening space 125 between the first and second side fastening portions 122 and 124. In this case, the sealing member 150 is provided to contact an end 112c of the first fastening portion 112, and the first fastening portion 112 may be forcibly, i.e., tightly, inserted into the sealing member 150. The sealing member 150 may be configured to include a support portion 151 that contacts the end 112c of the first fastening portion 112, and a pair of extending portions 152 respectively extended from opposite ends of the support portion 151 along outer and inner surfaces 112a and 112b of the first fastening portion 112, so as to cover the first fastening portion 112. Therefore, the first fastening portion 112 may be inserted into a separate space provided between the pair of extending portions 152 of the sealing member 150. For example, the sealing member 150 may be made of an elastic material, e.g., rubber or silicon.

In the sealing case 100 according to this embodiment, after the first fastening portion 112 is tightly inserted into the sealing portion 150, the combined first fastening portion 112 and sealing member 150 may be tightly inserted between the second fastening portions 122 and 124. In this case, the sealing member 150 and the first fastening portion 112 may be forcibly, i.e., tightly, inserted into the fastening space 125 between the second fastening portions 122 and 124. The first and second fastening portions 112, 122 and 124 may be made of same or similar materials as those of the main body 110 and the cover 120, respectively. For example, the first and second fastening portions 112, 122 and 124 may be made of a material exhibiting high rigidity so as to have excellent durability. Therefore, while the first and second fastening portions 112, 122 and 124 are not easily deformed, the sealing member 150 is made of an elastic material. Accordingly, a portion of the sealing member 150 may be compressed between the first fastening portion 112 and each of the second fastening portions 122 and 124.

For example, a length "l" of the support portion 151 of the sealing member 150 along the y-axis may be longer than a length "L" of the interval formed between the second fastening portions 122 and 124, and the length of each of the extending portions 152 along the y-axis may be longer than an interval along the y-axis between the first fastening portion 112 and each of the second fastening portions 122 and 124. Accordingly, the sealing member 150, i.e., each of the support and extending portions 151 and 152, may be compressed against respective ones of the first and second fastening portions 112, 122 and 124. The extending portions 152 can be supported by the second fastening portions 122 and 124. Since the first and second fastening portions 112, 122 and 124 are tightly attached to the sealing member 150, the sealing case 100 has a highly water-tight structure. Thus, battery packs, etc., which are housed in the sealing case 100, may be stably used for a long period of time even in a high-moisture environment.

The main body 110 may include a first coupling portion 113 protruding from the outer surface 112a of the first fastening portion 112 along the y-axis, and the cover 120 may include a second coupling portion 123 protruding along the y-axis from the second fastening portion 122 so as to face the first coupling portion 113. The first coupling portion 113 is protruded from the outer surface 112a of the first fastening portion 112 so as to be vertical to the first fastening portion 112, and the second coupling portion 123 is bent at an end of the first side portion 122 so as to be vertical to the first side portion 122. The first and second coupling portions 113 and 123 may be provided to overlap with each other.

When the first fastening portion 112 and the second fastening portions 122 and 124 are coupled to each other, the sealing member 150 is press-fitted between the first and second fastening portions 112, 122 and 124. Therefore, the first and second coupling portions 113 and 123 may be overlap and contact each other. Thus, the first and second coupling portions 113 and 123 may guide the first and second fastening portions 112, 122 and 124 to be fastened to each other, so that the sealing member 150 is not damaged due to an excessive force applied thereto. At least one first through-hole 113a may be provided in the first coupling portion 113, and a second through-hole 123a corresponding to the first through-hole 113a may be provided in the second coupling portion 123. The first and second through-holes 113a and 123a may be fastened by a separate fastening member 20. For example, the fastening member 20 may include a bolt, a stud, etc. That is, the first and second fastening portions 112, 122 and 124 are primarily coupled through forcible insertion by interposing the sealing member 150 therebetween, and may be further secondarily coupled by the first and second coupling portions 113 and 123 provided in a direction vertical to the first and second fastening portions 112, 122 and 124 at the outside of the first and second fastening portions 112, 122 and 124.

Thus, in the sealing case 100 according to this embodiment, both vertical coupling (the first and second coupling portions 113 and 123) and horizontal coupling (insertion of the sealing portion 150 between the first fastening portion 112 and each of a second fastening portions 122 and 124) are provided between the main body 110 and of the case 100 and the cover 120. In the horizontal coupling, at least five structures may be provided close to one another, e.g., compressing against each other. That is, since the sealing member 150 is press-fitted between the first and second fastening portions, micro-size moisture in addition to fluid water cannot penetrate from the outside into the inside of the sealing case 100. Further, since the sealing case 100 has strong durability against abrasion, the battery packs 10 may be stably used for a long period of time.

Hereinafter, other embodiments will be described with reference to FIGS. 4 to 7. Contents of these embodiments are similar to those of the embodiment described with reference to FIGS. 1 to 3B, and therefore, detailed repetitive descriptions will be omitted.

Figure 4:
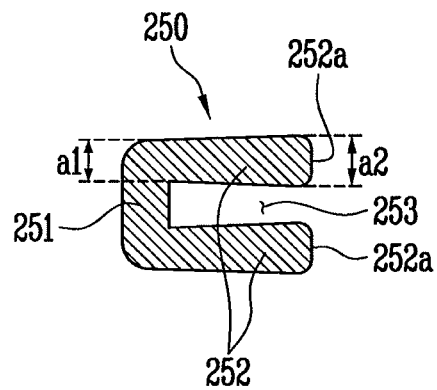
FIG. 4 illustrates a cross-sectional view of a sealing member according to another embodiment.

FIG. 4 illustrates a sectional view of a sealing member according to another embodiment.

Referring to FIG. 4, a sealing member 250 according to this embodiment may be interposed between the first and second fastening portions respectively provided to the main body and the cover. In this case, the sealing member 250 may be configured to include a support portion 251 that faces the end of the first fastening portion, and a pair of extending portions 252 respectively extended from opposite ends of the support portion 251 so as to surround the first fastening portion. For example, an edge 252a of the extending portion 252 may be rounded. The extending portion 252 may be provided so that the thickness of the extending portion 252 along the y-axis may increase as the extending portion 252 approaches the edge 252a thereof.

In detail, the extending portion 252 may have first and second thicknesses a1 and a2 along the y-axis that are different from each other. That is, the first thickness a1 of each of the extending portions 252 at a region adjacent to the support portion 251 may be smaller than the second thickness a2 of the extending portions 252 at the edge 252a thereof. In other words, the sealing member 250 may include a pair of extending portions 252 that are spaced apart from each other to define a separate space 253 therebetween. As the thicknesses a1 and a2 of the extending portion 252 are different from each other, the separate space 253 between the extending portions 252 may have a trapezoidal shape with a reverse slope in the direction of the extension of the extending portions 252.

The edge 252a of the extending portion 252 according to this embodiment may be rounded, and the rounded portion may be provided to overlap with the space between the first and second fastening portions. That is, in a case where the sealing member 250 is press-fitted between the first and second fastening portions, the rounded portion that is the edge 252a of the extending portion 252 may be efficiently adhered closely to the portion contacting the first and second fastening portions, thereby improving sealing performance.

In details, the first fastening portion may be inserted into the separate space 253 of the sealing member 250, and the combined structure of the first fastening portion and the sealing member 250 may be tightly inserted into a space between the second fastening portions. In this case, as the first thickness a1 is thinner than the second thickness a2 in the extending portion 252 of the sealing member 250, and the thickness of the extending portion 252 may be gradually increased as the extending portion 252 approaches from the first thickness a1 to the second thickness a2, tightness of the structure may increase. That is, since the first thickness a1 is thin, the sealing member 250 may be easily inserted into the space between the second fastening portions. Further, since the second thickness a2 is thick, the sealing member 250 may be sufficiently press-fitted between the second fastening portions. Accordingly, it may be possible to improve the sealing performance between the first and second fastening portions.

Figure 5:
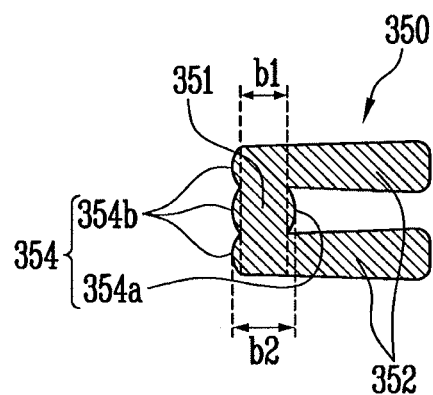
FIG. 5 illustrates a cross-sectional view of a sealing member according to still another embodiment.

FIG. 5 illustrates a sectional view of a sealing member according to still another embodiment.

Referring to FIG. 5, in a sealing member 350 according to this embodiment, any one of inner and outer surfaces of a support portion 351 may include an embossing 354 provided to protrude therefrom. For example, the inner surface of the support portion 351 of the sealing member 350 may include at least one first embossing 354a protruding toward the first fastening portion so as to contact the first fastening portion of the main body, and the outer surface opposite the inner surface of the support portion 351 may include at least one second embossing 354b protruding toward the second fastening portion so as to contact the second fastening portion of the cover. A pair of extending portions 352 may be provided at opposite ends of the support portion 351, respectively.

When the main body and the cover in the sealing case are coupled to each other, the first fastening portion is inserted between the second fastening portions. In this case, the sealing member 350 may be interposed between the first and second fastening portions so as to surround the first fastening portion. Here, the thickness of the support portion 351 of the sealing member 350 may be formed thicker than that of the space between the first and second fastening portions. That is, the value obtained by subtracting the first width b1, i.e., a thinnest portion in the support portion 351, from the second width b2, i.e., a thickest portion in the support portion 351, may be a value obtained by adding the heights of portions highest in the respective first and second embossings 354a and 354b. The first width b1 may correspond to the space between the first and second fastening portions along the x-axis, and the difference between the first and second widths b1 and b2 may correspond to the portion at which the sealing member 350 is compressed against the first and second fastening portions when coupled to each other. The first and second embossings 354a and 354b have elasticity improved by the shapes thereof, and thus the sealing member 350 can be easily compressed. For example, the first embossing 354a may be provided with one embossing, and the second embossing 354b may be provided with three embossings. The embossing positioned at a center among the second embossings 354b may be provided at a position corresponding to the first embossing 354a.

Figure 6:
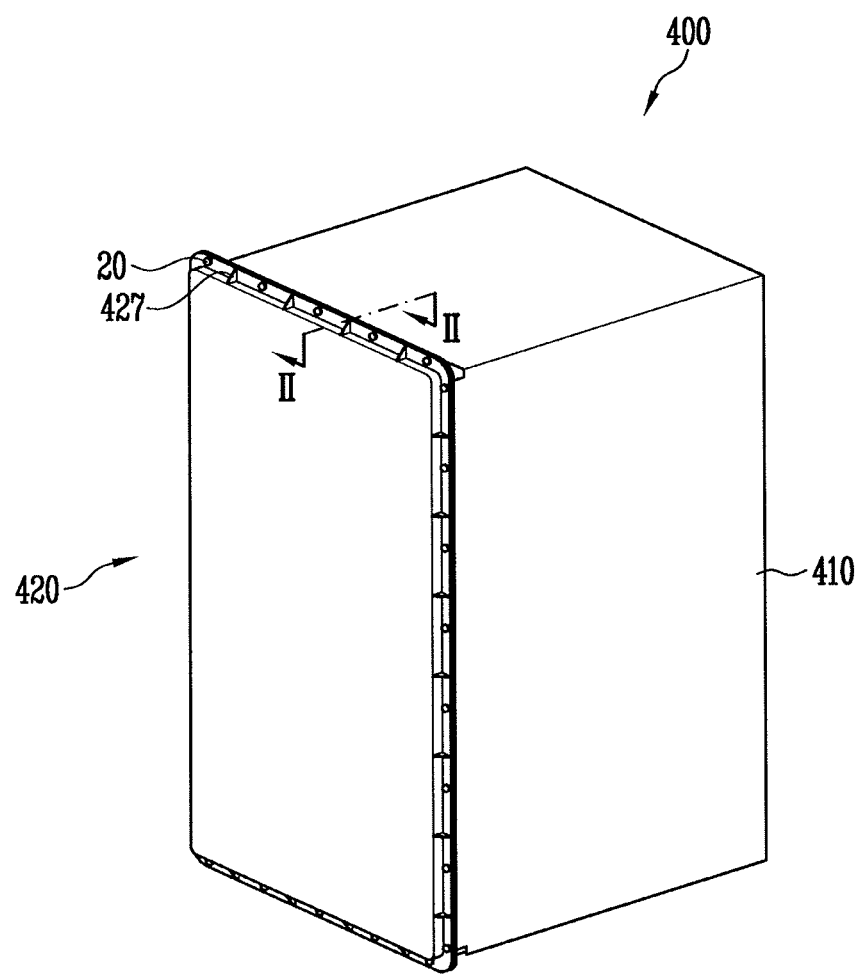
FIG. 6 illustrates a perspective view of a sealing case according to still another embodiment.
Figure 7:
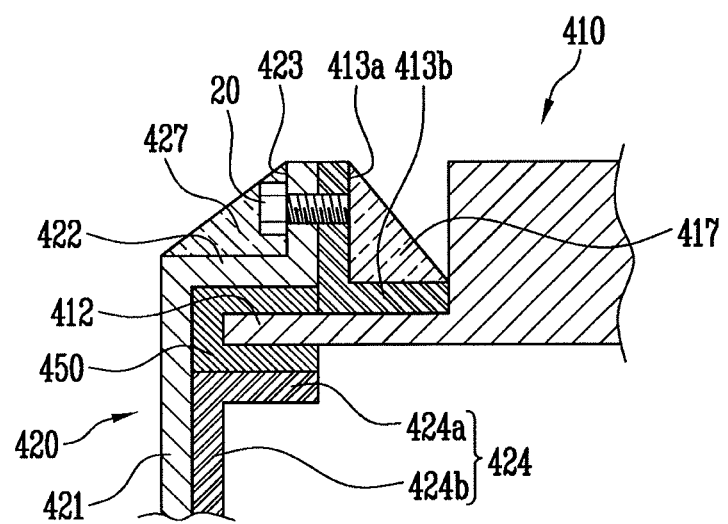
FIG. 7 illustrates a cross-sectional view along line II-II of FIG. 6.

FIG. 6 illustrates a perspective view of a sealing case according to still another embodiment. FIG. 7 illustrates a sectional view taken along line II-II of FIG. 6.

Referring to FIGS. 6 and 7, a sealing case 400 according to this embodiment may be configured to include a main body 410, a cover 420, and a sealing member 450. A first fastening portion 412 is provided to the main body 410 so as to be inserted into the sealing member 450, and subsequently, the first fastening portion 412 and the sealing member 450 may be inserted between second portions 422 and 424. The cover 420 may be configured to include a base portion 421 and the second fastening portions 422 and 424 protruded toward the main body 410 from the base portion 421. The second fastening portions 422 and 424 may be configured to include a first side portion 422 bent at an edge of the base portion 421, and a second side portion 424 inwardly spaced apart from the first side portion 422. For example, the second side portion 424 may be an L-shaped bracket provided on an inner surface of the base portion 421. As the second side portion 424 may have a l-Shaped structure, it is possible to improve the strength of the second fastening portions 422 and 424.

The first side portion 422 may connect between the base portion 421 and a second coupling portion 423. One end of the first side portion 422 may be substantially perpendicular to the base portion 421, and the other end of the first side portion 422 may be connected to the second coupling portion 423 perpendicular to the second side portion 422 so as to be parallel with the base portion 421.

The main body 410 may be provided with a first coupling portion 413a fastened to the second coupling portion 423 by a separate fastening member 20 to overlap the second coupling portion 423. The main body 410 may further include a flange portion 413b extended perpendicularly to the first coupling portion 413a at one end of the first coupling portion 413a so as to overlap an outer surface of the first fastening portion 413a. For example, the flange portion 413b may be extended and bent in parallel with the outer surface of the first fastening portion 412, and the first coupling portion 413a and the flange portion 413b may be integrally provided so that the section of the integrated first coupling portion 413a and flange portion 413b may have a L-shape.

The first coupling portion 413a and the first fastening portion 412 may be provided to be perpendicular to each other, and a first through-hole through which the separate fastening member 20 passes may be provided in the first coupling portion 413a to be coupled to the second coupling portion 423. At least one rib 417 may be provided on outer surfaces of the first coupling portion 413a and the flange portion 413b. The rib 417 may be spaced apart from the first through-hole so as to be alternately provided with the first through-hole. A second through-hole may be provided in the second coupling portion 423 so as to be fastened to the first through hole, and a second rib 427 may be provided to outer surfaces of the second coupling portion 423 and the side portion 422. The rib 427 may be spaced apart from the second through-hole so as to be alternately provided with the second through-hole.

The first rib 417 may be connected to the first coupling portion 413a and the first fastening portion 412, and the cross-section of the first rib 417 may be formed in a triangular shape. The cross-section of the second rib 427 may be formed in a triangular shape so as to connect the first side portion 422 and the second coupling portion 423. The first and second ribs 417 and 427 are provided, so that it is possible to improve the strength of the first and second coupling portions 413a and 423, thereby preventing warping of the first and second coupling portions 413a and 423. Further, the first and second coupling portions 413a and 423 may be fastened with high strength by the fastening member 20, so that it may be possible to decrease the number of fastening portions 20 by which the first and second coupling portions 413a and 423 are fastened. Accordingly, the productivity of the sealing case 400 may be improved.

In a conventional sealing case for housing battery packs, a gasket capable of performing surface-to-surface or line-to-line coupling using silicon sealing, foaming, etc., is interposed between a cover and a main body, in a state in which a separate structure is not provided to the cover and the main body, so as to have a watertight structure. However, an external fluid may penetrate into the sealing case due to abrasion of the gasket, e.g., over time, thereby reducing battery safety.

As described above, according to example embodiments, a sealing case may have a new coupling structure, where respective fastening portions of a main body and its cover are fitted into each other with increased compression, thereby reducing fluid permeation e.g., moisture permeation, therethrough. Accordingly, the sealing case may keeping battery packs for a long period of time even in a high moisture environment.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A sealing case, comprising:
a main body with an opening, the main body including a housing space therein;
a cover configured to cover the opening of the main body;
a first fastening portion along an outer circumferential portion of the opening of the main body;
a second fastening portion on the cover and corresponding to the first fastening portion; and
a sealing member interposed between the main body and the cover, the sealing member having a 'U' shape and being fitted between the first fastening portion on the main body and a second fastening portion on the cover,
wherein the sealing member contacts a terminal edge of the first fastening portion, the first fastening portion being tightly inserted into the sealing member,
wherein the sealing member includes a support portion and a pair of extending portions extended from opposite ends of the support portion to define the 'U' shape, the first fastening portion being inserted between the pair of extending portion, and the support portion contacting the terminal edge of the first fastening portion, and
wherein a thickness of the extending portion increases as the extending portion approaches the edge thereof.

2. The sealing case as claimed in claim 1, wherein the first fastening portion extends from the main body toward the cover, and the second fastening portion houses the first fastening portion.

3. The sealing case as claimed in claim 2, wherein the cover includes:
a base portion facing the opening of the main body; and
the second fastening portion along a perimeter of the base portion, the second fastening portion including a first side portion and a second side portion parallel to each other and extending from the base portion, the first fastening portion being inserted between the first and second side portions.

4. The sealing case as claimed in claim 3, wherein a fastening space is defined between the first and second side portions, the first fastening portion and the sealing member being inserted into the fastening space.

5. The sealing case as claimed in claim 1, wherein the main body includes a first coupling portion protruding from an outer surface of the first fastening portion, and the cover includes a second coupling portion protruding from the second fastening portion to face the first coupling portion.

6. The sealing case as claimed in claim 5, wherein the first coupling portion is perpendicular to the first fastening portion, the second coupling portion being bent from an end of the second fastening portion to be perpendicular to the second fastening portion, and the first and second coupling portions overlapping each other.

7. A sealing case, comprising:
a main body with an opening, the main body including a housing space therein;
a cover configured to cover the opening of the main body;
a first fastening portion along an outer circumferential portion of the opening of the main body;
a second fastening portion on the cover and corresponding to the first fastening portion; and
a sealing member interposed between the main body and the cover, the sealing member having a 'U' shape and being fitted between the first fastening portion on the main body and a second fastening portion on the cover,
wherein the main body includes a first coupling portion protruding from an outer surface of the first fastening portion, and the cover includes a second coupling portion protruding from the second fastening portion to face the first coupling portion,
wherein the first coupling portion is perpendicular to the first fastening portion, the second coupling portion being bent from an end of the second fastening portion to be perpendicular to the second fastening portion, and the first and second coupling portions overlapping each other, and
wherein at least one first through-hole is provided in the first coupling portion and at least one second through-hole corresponding to the first through-hole is provided in the second coupling portion, the first and second through-holes being fastened by a fastening member.

8. The sealing case as claimed in claim 7, wherein the sealing member contacts a terminal edge of the first fastening portion, the first fastening portion being tightly inserted into the sealing member.

9. The sealing case as claimed in claim 8, wherein the sealing member includes a support portion and a pair of extending portions extended from opposite ends of the support portion to define the 'U' shape, the first fastening portion being inserted between the pair of extending portion, and the support portion contacting the terminal edge of the first fastening portion.

10. The sealing case as claimed in claim 9, wherein an edge of the extending portion is rounded.

11. The sealing case as claimed in claim 9, wherein a thickness of the extending portion increases as the extending portion approaches the edge thereof.

12. The sealing case as claimed in claim 9, wherein at least one of an inner surface and an outer surface of the support portion includes an embossing protruding therefrom.

13. The sealing case as claimed in claim 12, wherein the inner surface of the support portion includes at least one first embossing protruding toward the first fastening portion to contact the first fastening portion, and the outer surface of the support portion opposite the inner surface includes at least one second embossing protruding toward the second fastening portion to contact the second fastening portion.

14. A sealing case, comprising:
- a main body with an opening, the main body including a housing space therein;
- a cover configured to cover the opening of the main body;
- a first fastening portion along an outer circumferential portion of the opening of the main body;
- a second fastening portion on the cover and corresponding to the first fastening portion; and
- a sealing member interposed between the main body and the cover, the sealing member having a 'U' shape and being fitted between the first fastening portion on the main body and a second fastening portion on the cover,
- wherein the main body includes a first coupling portion protruding from an outer surface of the first fastening portion, and the cover includes a second coupling portion protruding from the second fastening portion to face the first coupling portion,
- wherein the first coupling portion is perpendicular to the first fastening portion, the second coupling portion being bent from an end of the second fastening portion to be perpendicular to the second fastening portion, and the first and second coupling portions overlapping each other, and
- wherein the main body further comprises a flange portion perpendicular to the first coupling portion at one end of the first coupling portion, the flange portion overlapping the outer surface of the first fastening portion.

15. A sealing case, comprising:
- a main body with an opening, the main body including a housing space therein;
- a cover configured to cover the opening of the main body;
- a first fastening portion along an outer circumferential portion of the opening of the main body;
- a second fastening portion on the cover and corresponding to the first fastening portion; and
- a sealing member interposed between the main body and the cover, the sealing member having a 'U' shape and being fitted between the first fastening portion on the main body and a second fastening portion on the cover,
- wherein the main body includes a first coupling portion protruding from an outer surface of the first fastening portion, and the cover includes a second coupling portion protruding from the second fastening portion to face the first coupling portion,
- wherein the first coupling portion is perpendicular to the first fastening portion, the second coupling portion being bent from an end of the second fastening portion to be perpendicular to the second fastening portion, and the first and second coupling portions overlapping each other, and
- wherein the main body further comprises at least one first rib on outer surfaces of the first coupling portion and the first fastening portion, the first rib being spaced apart from the first through-hole.

16. The sealing case as claimed in claim 15, further comprising a second rib on the second coupling portion at a position corresponding to the first rib.

17. The sealing case as claimed in claim 15, wherein the first rib is connected to the first coupling portion and the first fastening portion, the first rib having a triangular cross-section and being perpendicular to the first coupling portion and the first fastening portion.

* * * * *